United States Patent Office 3,360,069
Patented Dec. 26, 1967

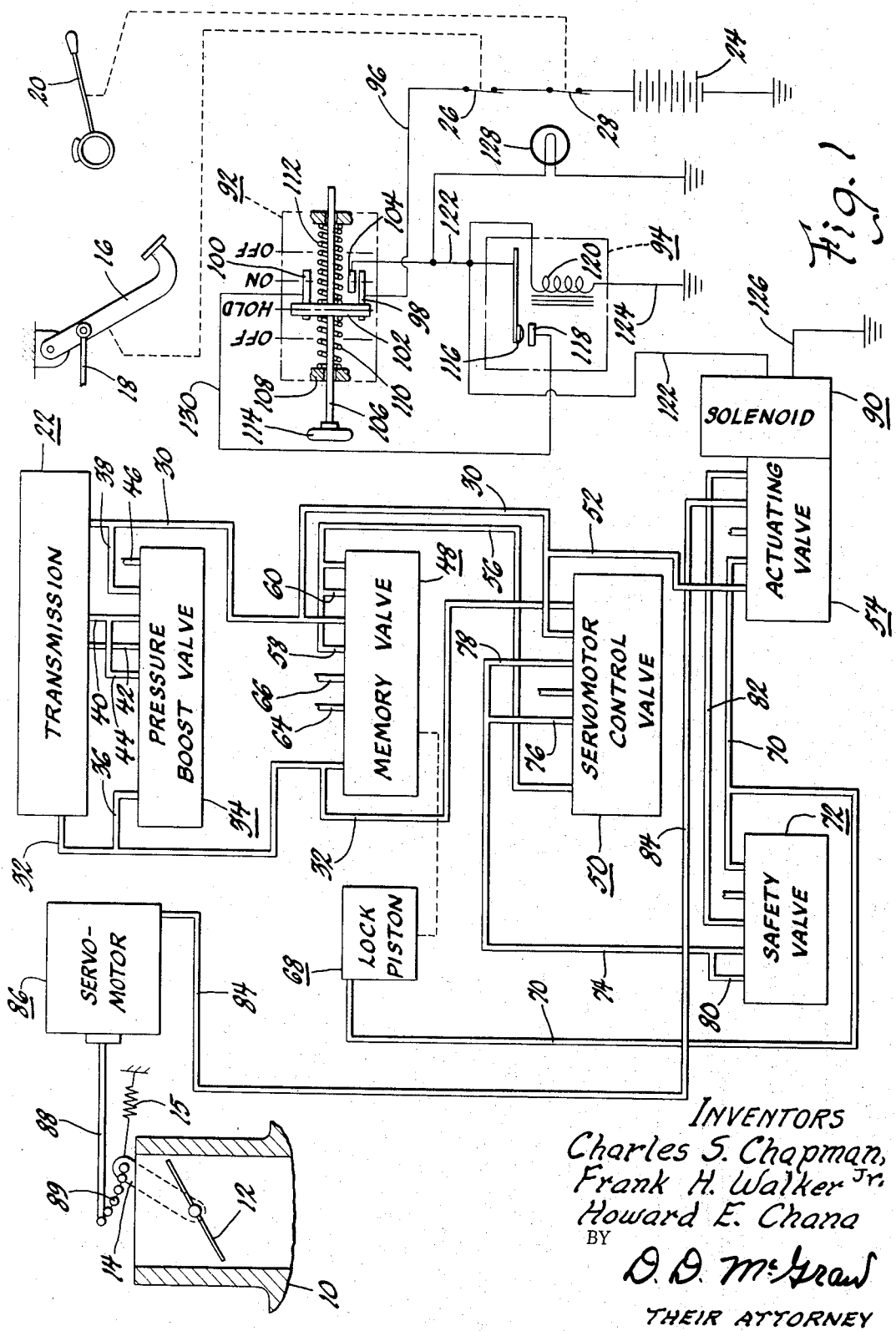

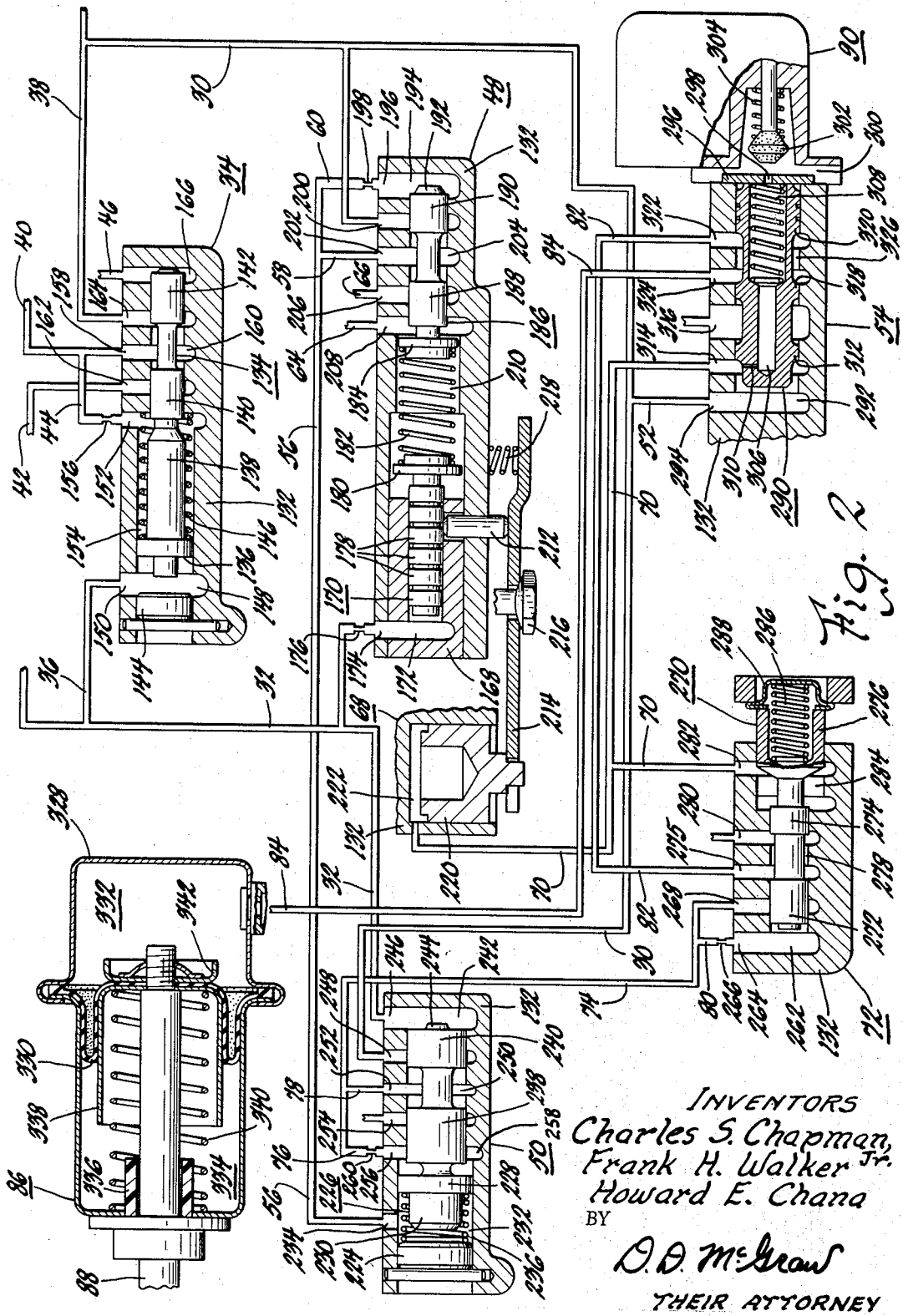

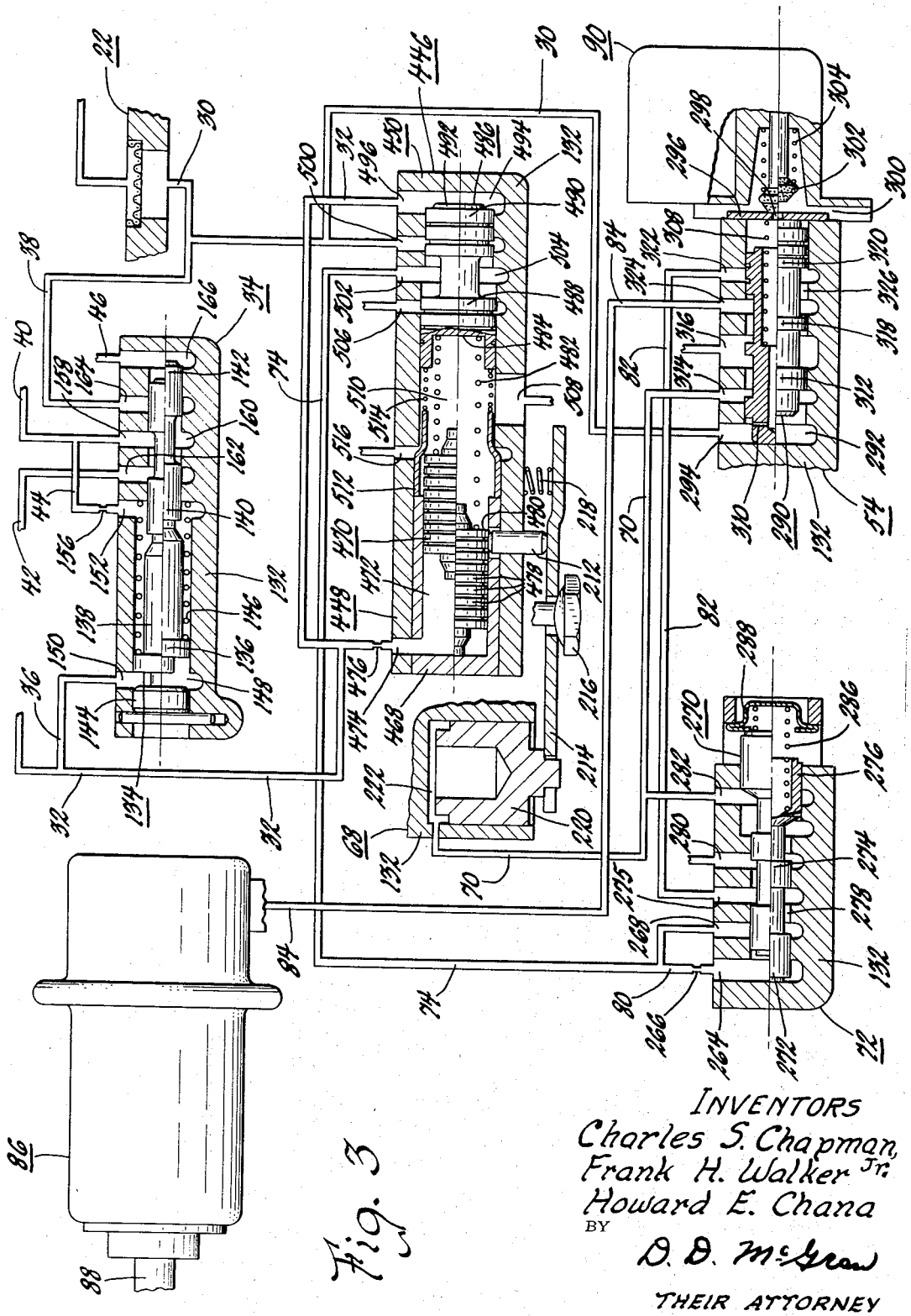

3,360,069
FLUID PRESSURE CONTROL SYSTEM AND MECHANISM FOR CONTROL OF VEHICLE ROAD SPEED
Howard E. Chana, Flint, and Charles S. Chapman, Jr. and Frank H. Walker, Grand Blanc, Mich., assignors to General Motors Corporation, Detroit, Mich., a corporation of Delaware
Filed Dec. 6, 1965, Ser. No. 511,863
23 Claims. (Cl. 180—108)

ABSTRACT OF THE DISCLOSURE

A vehicle road speed control system and mechanism using the vehicle transmission governor pressure and a line pressure to sense and generate reference speed and actual vehicle speed signals and power pressures to control the vehicle engine so as to selectively establish and maintain the vehicle at a desired vehicle road speed under varying road load conditions. In one embodiment the governor pressure acts through certain valves and ports to modify the line pressure to generate a regulated pressure constituting the desired speed signal. In another embodiment governor pressure acts through valve means to store a force in a spring which reflects vehicle speed, and the valve means is selectively locked against further movement by governor pressure to stabilize the spring force at a value which reflects vehicle speed at the time the locking action occurs. A line pressure boost arrangement is provided to boost line pressure so that it is greater than the governor pressure at all operation speeds, to give accurate signals in all speed operating ranges. Amplification of a generated speed error signal is accomplished to improve system response.

---

The invention relates to a system utilizing fluid pressure as a source of power and as a control, and to mechanism forming components of the system. The invention more particularly relates to a vehicle road speed control system utilizing sensory information and power already available in the vehicle, and particularly in the transmission thereof. When the invention is embodied in such a road speed control in conjunction with a vehicle having a transmission of the automatic type, the system utilizes governor pressure produced by the transmission which is related to vehicle road speed, and transmission line pressure as a source of power. A system of this type can be adapted to a commercially produced transmission by providing either a modified transmission valve body having the control system valve and connections therein or providing a suitable additional valve body containing such valves and connections. The system embodies a method of vehicle speed selection wherein the speed at which the vehicle is actually traveling when the system is engaged is the speed selected as the desired or reference speed. The system and mechanism embodying the invention includes a memory arrangement which remembers the vehicle speed occurring at the time the system is energized and establishes that speed as the desired or reference speed. More particularly, the system continually generates a signal to be remembered, which may be referred to as a memory signal, and upon system energization that signal becomes locked or stabilized, thereby converting it into a selected desired vehicle speed signal. It is a particular feature of the invention that a vehicle speed reflective pressure is utilized to generate a speed signal, the generation of which is stopped or held in obeyance when the vehicle is traveling at the desired speed and the operator desires to have the system control the vehicle speed at this point. The speed signal so generated is thus stabilized as a constant signal and becomes the desired or reference speed signal of the vehicle which the system strives to maintain under varying road load conditions.

In one embodiment, the vehicle transmission governor pressure acts through appropriate valves and ports to modify transmission line pressure to generate the speed signal as a regulated pressure. Transmission line pressure is the power source for the speed signal in this modification. In another embodiment, the transmission governor pressure acts through a valve to store a force in a spring which varies with changes in governor pressure as the road speed of the vehicle changes. When the system is energized, the valve is locked against further movement by governor pressure, thus stabilizing the spring force at the force occurring when the system is energized. This force reflects the speed of the vehicle at the time of system energization. In many installations a more accurate control can be obtained by using a stored spring force signal instead of the regulated pressure signal of the other embodiment.

When a system embodying the invention is utilized in conjunction with a transmission in which line pressure is not always greater than the theoretical governor pressure required to accurately reflect vehicle road speed, the system is provided with means to boost the actual transmission line pressure above the theoretically required governor pressure for all operational speeds of the transmission, thereby permitting the actual governor pressure to be sufficient to give an accurate vehicle speed reflective signal in all system operating ranges. This is particularly desirable in the higher speed ranges where in many such transmissions the line pressure does not exceed the theoretically required governor pressure.

Another feature of the invention is the amplification of the speed error signal existing by virtue of the difference in signals reflecting the desired or reference speed and actual vehicle speed, thereby improving system response in comparison to systems having no such amplification.

Systems utilizing the invention require no pre-setting of the desired or reference vehicle speed. The vehicle operator merely drives the vehicle to obtain the speed he desires to select as his reference speed, and energizes the system. This requires only the push and release of a control knob. He may deenergize the system at any time, thereby returning vehicle speed control to the manual control system normally provided, by actuating the vehicle brakes or moving the control knob to a system deenergizing position. When desired, other deenergizing operator actions may be built into the system, tied in with the ignition switch, transmission selector, the opening of a door, etc.

Systems embodying the invention utilize many parts of automatic type transmissions which are being currently produced, therefore being more economical than systems which do not use power and signals and mechanism for producing them already present in the vehicle.

In the drawings:

FIGURE 1 is a schematic representation of a system and mechanism embodying the invention as installed in a vehicle having a suitable transmission and other controls.

FIGURE 2 is a schematic representation, with parts broken away and in section, showing details of the fluid pressure control system and mechanism embodying the invention and generally disclosed in FIGURE 1.

FIGURE 3 is a schematic representation of a modified fluid pressure control system and mechanism generally similar to the system and mechanism of FIGURE 2, and having parts broken away and in section.

The system installation generally set forth in FIGURE 1 includes a vehicle having an engine 10 which powers the vehicle under control of the vehicle operator. The engine has a suitable speed and power control which includes the throttle valve 12, throttle linkage 14 and throttle valve return spring 15. The vehicle is also illustrated as having a brake pedal 16 which when actuated acts through the push rod 18 to apply the vehicle brakes. The vehicle may also include a transmission selector lever 20 which selects various operating conditions for the vehicle transmission 22. Since portions of the system of FIGURE 1 are electrically controlled or operated, a source of electrical energy represented as the vehicle battery 24 is also provided. The brake pedal 16 is illustrated as opening a normally closed brake pedal switch 26 when the vehicle brakes are applied. Similary the transmission selector lever 20 is illustrated as maintaining a transmission selector switch 28 in the closed position only in certain desired transmission operating positions. Such positions may, for example, be only the forward drive position or positions, or only the highest of the drive ranges of a multiple forward drive position transmission.

The transmission 22 has a transmission line pressure output through the conduit 30. As is commonly found in transmissions of the automatic type, line pressure is the basic power source for various operational mechanisms in the transmission. It is commonly utilized to actuate appropriate servomotors to cause the transmission to be in reverse, neutral and forward drive positions as selected by the vehicle operator. The transmission has a governor pressure output through conduit 32. This pressure is generated by the transmission when the vehicle is moving, and accurately reflects the vehicle road speed. In some commercially produced transmissions, the governor pressure will accurately reflect vehicle road speed throughout the operational range of the transmission, while in others the governor pressure and the line pressure tend to level off at higher vehicle speeds. In the latter type of transmission, the governor pressure will not accurately reflect higher vehicle speeds. When such a transmission is utilized, the system embodying the invention includes a pressure booster valve assembly 34. This assembly receives governor pressure from conduit 32 through conduit 36 connected therewih, and receives transmission line pressure from conduit 30 through conduit 38 connected therewith. As illustrated, the valve assembly 34 produces a modulator pressure which is transmitted through conduit 40 to a suitable portion of the transmission such as the transmission front pump so that line pressure is boosted the necessary amount to keep above the required governor pressure to accurately reflect vehicle speed by a predetermined minimum amount. Modulator pressure may also be transmitted through conduit 42 to other portions of the transmission which may have need of such a pressure. Modulator pressure may also be returned to a portion of the valve assembly 34 by conduit 44 which is connected to conduit 40. A suitable exhaust pressure conduit 46 may also be provided from the valve assembly 34.

Line pressure conduit 30 and governor pressure conduit 32 are also fluid connected to a memory valve assembly 48 and a servomotor control valve assembly 50. Transmission line pressure is also connected by conduit 52, which is connected with conduit 30, to an actuating valve assembly 54.

The memory valve assembly 48 has a memory pressure conduit 56 connecting that assembly and the servomotor control valve assembly 50. Conduit 56 is connected with various portions of the memory valve 48 through branch conduits 58 and 60. Suitable exhaust conduits 64 and 66 are also provided as a part of valve assembly 48. A lock mechanism 68, preferably constructed as a servomotor piston and mechanical locking connections as more particularly illustrated in FIGURE 2, is mechanically connected to the memory valve assembly 48 and is hydraulically connected by locking pressure conduit 70 to the actuating valve assembly 54. Conduit 70 is also connected to a safety valve assembly 72.

The servomotor control valve assembly 50 has a control pressure output conduit 74, actually connected with valve assembly 50 through branch conduits 76 and 78. Conduit 74 is directly connected to a safety valve 72 and has another branch conduit 80 which connects to another part of the safety valve assembly 72. Control pressure conduit 82 connects the safety valve assembly 72 and the actuating valve assembly 54. The control pressure conduit 84 connects the actuating valve assembly 54 and servomotor 86. This servomotor is provided with a movable push rod 88 which is so connected to the throttle linkage 14 that an increase in fluid pressure delivered to servomotor 86 through conduit 84 will act on the throttle linkage to move the throttle valve 12 in throttle valve opening direction, thus increasing the engine delivered power or speed or both. The chain 89 attached to push rod 88 and throttle linkage 14 will serve this purpose. Similarly, push rod 88 acts on the chain 89 when the pressure delivered to the servomotor 86 through conduit 84 is decreased to permit the throttle valve spring to move the throttle valve 12 toward the closed throttle position to decrease the engine delivered power and/or speed and therefore tending to decrease vehicle speed.

The sub-system for controlling the energization and deenergization of the fluid control system is preferably electrical and includes a solenoid 90 connected to and forming a part of the actuating valve assembly 54. A control switch assembly 92 is electrically connected to solenoid 90 through a holding switch assembly 94. The battery or other source of electrical power 24 is illustrated as being connected in series through switches 26 and 28 by electrical lead 96 to a contact 98 of switch assembly 92. Contact 98, and a similar contact 100, are relatively long contact bars which are electrically connected by a slide bar 102 when the control switch assembly 92 is in its normal position. In the position of slide bar 102 illustrated in FIGURE 1, the slide bar is in the "hold" position and electrically connects contacts 98 and 100. A contact 104 is positioned adjacent one end of contact 98 so that it is electrically connected to contacts 98 and 100 when the slide bar 102 is moved to the "on" position illustrated. Slide bar 102 is mounted on a rod 106 slidably positioned in the control switch assembly case 108. Opposed springs 110 and 112 normally center the slide bar 102 in the "hold" position. When the knob 114 on one end of rod 106 is pushed to move the slide bar 102 to the "on" position, spring 112 is compressed while contacts 98, 100 and 104 are electrically connected. If the knob 114 is pushed farther in the same direction, slide bar 102 will be moved to the "off" position illustrated in the drawing as being on the inner or right side of the assembly 92. This will electrically disconnect contacts 98, 100 and 104. Release of the knob will cause the slide bar 102 to return through the "on" position to the "hold" position. This is utilized by the vehicle operator when he has the vehicle traveling at one set speed and he desires to have it travel at a different set speed. He holds the switch in the inner "off" position until the vehicle accelerates or decelerates to the new desired speed, and then releases it. The system is re-energized as the slide bar basses through the "on" position, and remains energized as it stops in the "hold" position. If the vehicle operator pulls the knob 114 outwardly, the slide bar 102 will move to the "off" position illustrated on the left side of switch assembly 92. This will disconnect contacts 98 and 100. When the knob is released, the slide bar 102 will move back to the "hold" position reconnecting conduits 90 and 100 but not having at any time connected contact 104 with contacts 98 and 100. The system will therefore remain deenergized.

The holding switch assembly 94 has normally open contacts 116 and 118 and holding coil 120. Contact 104 of switch assembly 92 is connected to contact 116 through electrical lead 122 and also is electrically connected to coil 120 and to solenoid 90. The other side of coil 120 from electrical lead 122 is grounded through electrical lead 124. The other side of solenoid 90 from electrical lead 122 is grounded through electrical lead 126. Lead 122 may also have a branch connection through an indicator lamp 128 to ground. Thus when lead 122 is electrically energized, lamp 128 will be on. Contact 100 is electrically connected through electrical lead 130 to the contact 118 of the holding switch assembly 94.

When the control switch assembly 92 has the slide bar 102 in the "off" position, the contacts 116 and 118 of the holding switch assembly are open. Assuming the system to have been completely deenergized, electrical power is available at contact 98. When the slide bar 102 is in the "hold" position illustrated, electrical power is likewise available at contact 118. In order to energize the system, the operator pushes knob 114 to move slide bar 102 to the "on" position. This connects contacts 98 and 104, thereby energizing coil 120 and closing holding switch contacts 116 and 118. Solenoid 90 is also energized. The operator then releases knob 114 and the slide bar 102 is moved to the "hold" position. This maintains contacts 98 and 100 in electrical contact, keeping holding coil 120 energized, and thereby holding contacts 116 and 118 in engagement and maintaining solenoid 90 energized. If the operator pushes the knob 114 inwardly to the right or inner "off" position, the electrical system will be deenergized. However, when releasing the knob 114, slide bar 102 moves through the "on" position to reenergize the system and stops in the "hold" position to keep the system energized. The system will then have been energized to select the vehicle speed at which the vehicle is traveling when the vehicle operator released the knob 114 from the inner "off" position.

If, however, with the slide bar 102 in the "hold" position and coil 120 energized, the operator pulls the knob 114 outwardly, slide bar 102 moves to the left or outer "off" position, electrically disconnecting contacts 98 and 100. This deenergizes solenoid 90 and holding coil 120. When the operator releases the knob 114, slide bar 102 moves back to the holding position, but the system is not reenergized.

The system may also be deenergized if either switch 26 or switch 28 is open. If desired, the ignition switch may also be wired in series between battery 24 and contact 98, as may other suitable control switches. All of the deenergizing switches such as switches 26 and 28 need not be provided in any one system since different installations may make different deenergization switches desirable.

As noted above, FIGURE 2 is a schematic representation of the fluid control valves and other mechanism forming a part of the entire system illustrated in FIGURE 1. The pressure boost valve assembly 34 has a bore in a part of the valve mechanism housing 132 which has one portion of a larger diameter than the other portion. A spool valve 134 is reciprocably received in the bore. Valve 134 has a land 136 on one end fitting in the larger portion of the bore, a smaller land 138 also received in the larger section of the bore and radially spaced from the wall thereof, another land 140 separated from land 138 by a reduced diameter valve section, and a land 142 on the other end of the valve separated from land 140 by another reduced diameter valve section. Both valve ends have small bosses which prevent the entire valve land areas from seating when the valve is in either extreme position. A plug 144 seals the open end of the bore. A valve spring 146 is received in the larger bore section about land 138 so that one end seats against land 136 and the other end seats against a portion of the housing 132. The left end of the bore, as seen in FIGURE 2, forms a chamber 148 between the plug 144 and the land 136. A port 150 connects governor pressure conduit 36 with chamber 148. Another port 152 connects modulator pressure conduit 44 with the chamber 154 in which spring 146 is received through a restriction 156. Port 158 connects modulator pressure conduit 40 and chamber 160, which is formed about the reduced diameter valve section separating valve lands 140 and 142. Port 162 is intermediate ports 152 and 158, connects the valve body bore with conduit 42, and is in a position so that the right edge of land 140 can open the port and connect it with chamber 160 when the valve 134 is positioned sufficiently leftward. Port 164 connects the valve bore and transmission line pressure conduit 38 and is so positioned that the left edge of valve land 142 regulates the admission of line pressure through chamber 160 to port 158. The exhaust conduit 46 is connected to a chamber 166 at the right end of valve land 142.

While the various valves in the system are schematically illustrated as being in separate housings, in practice they would usually be provided in a single valve body or housing 132. Memory valve assembly 48 therefore includes a double stepped bore provided in housing 132. The largest bore section has a plug 168 in the left end thereof which has a recessed bore axially aligned with the memory valve assembly bore so that valve 170, reciprocably received in the plug recessed bore, is also axially aligned in the memory valve assembly bore. The plug bore has an open end opening into the memory valve assembly bore. The left end of the plug bore is formed as a chamber 172 which is connected through port 174 to the governor pressure conduit 32 by way of a restriction 176. The left end of valve 170 has a reduced diameter end so that pressure in chamber 172 is always capable of urging the valve to the right. Valve 170 is illustrated as being provided with a series of lands 178 formed on the portion of the valve within the plug bore, and an enlarged end land 180 which fits with radial clearance within the largest section of the memory valve assembly bore.

The intermediate diameter section of the memory valve assembly bore has a compression spring 182 therein, one end of which engages valve end land 180, and the other end of which engages the valve end land 184 of valve 186. Valve 186 is reciprocably mounted in the smallest diameter section of the memory valve assembly bore, which is at the opposite end of the bore from the largest diameter section. Valve 186 has lands 188 and 190 axially spaced from each other by a reduced diameter valve section, with land 188 being axially spaced from end land 184 by another reduced diameter valve section. The reduced valve end 192 is in the end chamber 194 formed at the outer end of the smallest diameter bore section. Chamber 194 is connected through port 196 and restriction 198 to the branch conduit 60 of memory pressure conduit 56. Port 200 is adjacent port 196 in housing 132 and connects the smallest memory valve bore section with the transmission line pressure conduit 30. Port 202 is next adjacent port 200 and connects memory pressure branch conduit 58 with a chamber 204 provided by the reduced diameter valve section between valve lands 188 and 190. Port 200 is so positioned relative to port 202 and chamber 204 that the left edge of land 190 regulates the line pressure from port 200 to port 202 to generate the memory pressure. Exhaust ports 206 and 208 respectively connect the smallest and intermediate diameter sections of the memory valve assembly bore to exhaust. Exhaust port 206 is so positioned that sufficient leftward movement of valve 186 will cause chamber 204 to be connected to exhaust through that port. Exhaust port 208 keeps the chamber 210 in which spring 182 and valve ends 180 and 184 are positioned at exhaust pressure at all times.

A lock pin 212 extends through a radially formed aperture in housing 132 and plug 168 so that it is engageable with one or more of the valve lands 178 and when urged radially inward will side load valve 170 to hold it against movement. A lock lever 214 is pivotally mounted on a pivot pin 216 and in engagement with lock pin 212 so that pivotal movement of the lever in the counterclockwise direction as shown in FIGURE 2 will cause the pin to lock or stabilize valve 170. A suitable spring 218 is provided which urges lever 214 in the clockwise pivoting direction, therefore urging the lock pin 212 toward the valve release position. The other end of lever 214 from pin 212 is connected to the lock servo 68 and more particularly to the servo piston 220 thereof. The lock servo 68 has a pressure chamber 222 formed in housing 132 with piston 220 providing a movable wall thereof. Chamber 222 is connected with the lock pressure conduit 70. It can be seen that a buildup of pressure in chamber 222 will cause servo piston 220 to move outwardly, pivoting lever 214 counterclockwise against the force of spring 218, moving locking pin 212 into locking engagement with the valve 170. Release of pressure in chamber 222 permits spring 218 to pivot lever 214 clockwise and release locking pin 212 from valve 170.

The servomotor control valve assembly 50 has a step bore formed in housing 132 having a large diameter section at one end and a small diameter section at the other end with a plug 224 closing off the open end of the large diameter section. A valve 226 is reciprocably received in the bore and has an enlarged land 228 fitting the large diameter bore section. The reduced area valve end 230 adjacent land 228 faces plug 224 and is contained in a chamber 232 of the large diameter bore section. Port 234 connects memory pressure conduit 56 with chamber 232. The valve spring 236 is also positioned in chamber 232 and urges valve 226 to the right as seen in FIGURE 2. Valve 226 has lands 238 and 240 formed thereon and separated by a reduced diameter valve section. Another reduced diameter valve section separates lands 228 and 238. The smaller diameter bore section is reciprocably received in lands 238 and 240 and has the right end thereof formed to provide a chamber 242 in which a reduced end 244 of the valve 226 is positioned. Port 246 connects governor pressure conduit 32 with chamber 242. Another port 248 connects line pressure conduit 30 with the smaller diameter section of the bore and is so positioned that the left edge of land 240 regulates line pressure into chamber 250, positioned between valve lands 238 and 240 in the bore. The port 252 connects chamber 250 with the control pressure branch conduit 78. An exhaust port 254 is positioned so that it is closed by land 238 until valve 226 moves sufficiently leftward to connect chamber 250 and port 252 past the right edge of land 238. A port 256 connects the chamber 258 provided by the right end of the larger bore section and generally intermediate lands 228 and 238 with the control pressure branch conduit 76 through a restriction 260.

A safety valve assembly 72 has a bore formed in housing 132 with a larger diameter section at the right end as seen in FIGURE 2 and a smaller diameter section at the left end. The left end of the bore is formed to provide a chamber 262 which is connected by way of port 264 and restriction 266 to the memory pressure branch conduit 80. Port 268 is positioned adjacent port 264 and is connected with memory pressure conduit 74. Valve 270 is reciprocably received in the safety valve assembly bore. The valve has spaced lands 272 and 274 received in the smaller bore section and separated by a reduced diameter valve section, and a recessed end land 276 reciprocably received in the larger bore section. When the valve is in the leftward position, the right edge of land 272 admits control pressure from port 268 into smaller bore section chamber 278 provided between lands 272 and 274 and into conduit 82 through port 275. Exhaust port 280, which connects with chamber 278 when the valve is in the rightward position shown, is closed by land 274 at this time. A port 282 connects locking pressure conduit 70 with a chamber 284 provided in a part of the larger bore section and containing the reduced diameter valve section intermediate lands 274 and 276. A valve spring 286 fits in the recess of end land 276 and reacts against the spring seat 288 to urge the valve in the leftward direction. Sufficient rightward movement of valve 270 from the leftward position will first close off the connection of port 268 to chamber 278 and then open the connection of port 282 to chamber 284. Chamber 284 was previously at exhaust pressure since it had been connected with port 280 while the valve was in its full left position. Thus control pressure from conduit 74 is cut off from conduit 82 and pressure from conduit 70 is then provided in chamber 284.

The actuating valve assembly 54 includes a bore formed in housing 132 in which spool valve 290 is reciprocably received. The actuating valve bore is a recess having the left end thereof forming chamber 292 which is connected by port 294 to the transmission line pressure conduit 52. The right end of the bore is closed by a plate 296 in which an orifice 298 is provided substantially on the axis of the bore. The other side of plate 296 is open to exhaust at 300. Solenoid assembly 90 is mounted adjacent plate 296 so that the solenoid operated valve 302 is in alignment with orifice 298 to open and close that orifice. Valve 302 has a spring 304 urging it against orifice 298 to close it. When the solenoid assembly 90 is electrically energized, valve 302 is moved rightwardly against spring 304 to open orifice 298, thereby connecting the end of the actuating valve assembly bore to exhaust through that orifice. The actuating valve 290 has a recess 306 formed from the right end thereof and extending axially therein. Recess 306 has a large section adjacent the right end which contains a spring 308 seated against plate 296 and a shoulder in the valve so that the spring urges the valve to the left. The smaller section of recess 306 adjacent the left end of valve 290 terminates at a small radially extending passage 310 which connects chamber 292 with the recess 306. The left end of valve 290 has a reduced diameter end through which bleed orifice or passage 310 is radially formed. A valve land 312 is positioned adjacent passage 310 and controls a port 314 connected with lock pressure conduit 70. When the valve is in the right position shown in FIGURE 2, land 312 is to the right of port 314, thereby connecting conduit 70 with line pressure through chamber 292. An exhaust port 316 is positioned adjacent port 314 so that when the valve is in the left position, land 312 disconnects port 314 from chamber 292 and connects it with the exhaust port, thereby connecting the locking pressure conduit to exhause. Valve 290 has spaced lands 318 and 320 separated therefrom by a reduced diameter valve section, with land 318 also being separated from land 312 by another reduced diameter valve section adjacent the exhause port 316. Ports 322 and 324 respectively connect control pressure conduits 82 and 84 with the actuating valve bore. A chamber 326 is formed by the reduced diameter valve section between lands 318 and 320. When the valve is in the right position shown in FIGURE 2 port 322 and 324 are connected through this chamber. When the valve is in the left position, port 322 is closed by land 320 and port 324 is connected to the exhaust port 316.

The servomotor 86 includes a housing 328 divided by a rolling diaphragm or power wall 330 into a power chamber 332 and another chamber 334. Chamber 334 is at atmospheric pressure. Control pressure conduit 84 is fluid connected to power chamber 332 so that control pressure is delivered to that chamber. The servomotor push rod 88 extends through the end of the housing defining a part of chamber 334. This housing end is provided with a suitable guide bearing 336. Chamber 334 contains a piston 338 monuted on the end of the push rod extending into the servomotor. A piston return spring 340 seats against the left end of the housing 328 and against the piston 338 so that it urges the piston and diaphragm 330 to the right tending to decrease the volume of the power chamber 332. The diaphragm 330 is secured to the head of piston 338 and to the end of the push rod 88 by a retainer 342. It can be seen that an increase in pressure in power chamber 332 will move push rod 88 leftwardly as seen in FIGURES 1 and 2, causing the throttle valve 12 to move in an opening direction. Similarly a decrease in pressure in power chamber 332 results in repositioning of the power wall 330 by the spring 340 so that the push rod 88 is moved to the right to allow the return spring 15 to move the throttle valve 12 in the throttle valve closing direction.

The operation of the system illustrated in FIGURES 1 and 2 is as follows. The initial condition of the system is assumed to be with the slide bar 102 in the "hold" position illustrated in FIGURE 1, switches 26 and 28 closed, contacts 116 and 118 open, solenoid 90 deenergized, and the vehicle traveling at some reasonable speed under power of engine 10 with the transmission in a forward drive range. Valve 302 of the actuating valve assembly is in the leftward position so that orifice 298 is closed. Valve 290 is in the left position. The servomotor 86 is at exhaust pressure. Transmission line pressure is delivered to valve assemblies 34, 48, 50 and 54. Governor pressure is delivered to valve assemblies 34, 48 and 50. The pressure boost valve assembly 54 has its valve 134 so positioned by governor pressure acting on the left end of the valve in opposition to spring 146 that modulator pressure is generated in chamber 160 and transmitted through conduit 40 to the transmission so that line pressure is maintained above the theoretically required governor pressure, thereby permitting the governor pressure to accurately reflect vehicle speed. If the transmission is such that the pressure boost valve assembly 34 is not required for this purpose, it is, of course, not provided. In the arrangement shown, however, the transmission requires the use of the line pressure boost valve.

In order to more easily describe the manner of operation of the system, typical pressures will be discussed. It is to be understood, however, that these pressures are cited by way of example and not by way of limitation. Assuming that the minimum transmission line pressure is 56 p.s.i. for transmission governor pressures between 0 and 48 p.s.i., it may be required that minimum transmission line pressure for governor pressures above 48 p.s.i must be equal to the governor pressure plus 8 p.s.i. A typical transmission of this type, well known in the art, will have a minimum line pressure established by a main pressure regulator valve and valve spring located in the front pump of the transmission. This pressure can be raised by a modulator pressure which acts on the boost area of the main pressure regulator valve system. Modulator pressure is zero for minimum line pressure. As the governor pressure rises above the value of 48 p.s.i., forces on the valve 134 are such as to start moving it from the left hand position to the right hand position. As land 142 opens the line pressure port 164 it regulates modulator pressure into chamber 160 and through conduit 40 to the transmission in order to boost the line pressure in the manner above described. As the modulator pressure builds up, it is fed back through bleed orifice or restriction 156 to act on the differential area of lands 136 and 140. This net effective force plus the force of spring 146 counteracts the force of governor pressure acting on land 136 in chamber 148. The diameters of lands 136, 140 and 142 are so selected that at 48 p.s.i. the valve begins to regulate the modulator pressure to the front pump. Valve regulation is such that after the governor pressure is above 48 p.s.i., the modulator pressure to the front pump is such a value that the line pressure from the transmission will always be 8 p.s.i. higher than the governor pressure required to accurately reflect vehicle speed. The land 140 connects chamber 160 to port 162 so that the transmission case modulator pressure or throttle valve modulated pressure is available in such a position that the modulator pressure in conduit 40 will never be less than the case modulator pressure. The pressure boost valve assembly 34 therefore insures sufficient line pressure in conduit 30 and accurate governor pressure in conduit 32.

The function of the memory valve assembly 48 is to remember the vehicle speed occurring at the time that the system is energized. The valve arrangement comprises two operating valves 170 and 186. The lands 188 and 190 of valve 186 are of equal diameters. Transmission governor pressure acts on the left end of valve 170 in chamber 172, transmitting a force to the spring 182 which is equal to the force generated by the governor pressure acting over the area of the end of the valve. This force is likewise transmitted from the spring 182 to the valve 186. Due to the regulating nature of valve 186 at port 200, a memory or speed signal pressure is produced in chamber 204. This pressure is determined by the differential areas of the left end of the valve 170 and the area of land 190, and the governor pressure. The pressure so produced in chamber 204 and found in conduit 56 is referred to as a memory pressure or a vehicle speed signal which varies as the governor pressure varies so long as valve 170 is not locked against movement by the governor pressure. The minimum value of the memory pressure is determined by the installed load of spring 182 and its maximum value is determined by the spring load of spring 182 when the valve 170 is at its extreme right position. Proper selection of spring 182 determines the operating range of the system. For example, the operating range may be set between 0 and 100 m.p.h., 20 and 90 m.p.h., or any other suitable minimum and maximum range values of vehicle speed. The memory valve assembly 48 is in operation whenever the transmission 22 is functioning and produces a governor pressure which represents vehicle speeds in the range selected by spring 182.

The memory valve lock system operates when actuated to stabilize the memory pressure so that the pressure in conduit 56 reflects the desired or reference vehicle speed. The lock piston 220 is in contact with the lock lever 214, which pivots about the pivot pin or adjusting bolt 216. When the system is engaged, hydraulic pressure is fed from the actuating valve assembly 54 through conduit 70 to pressure chamber 222. The force generated by this pressure on the area of piston 220 is transmitted by the lever 214. The lever multiplies this force by a convenient ratio and delivers the force to the lock pin 212. This pin transmits the multiplied force to the valve 170, and particularly to one or more lands 178 thereof, side loading the valve with sufficient force so that the valve is prevented from moving even though the governor pressure in chamber 172 may change. This holds the memory pressure in conduit 56 fixed even though the governor pressure which is related to vehicle speed may change. When the system is disengaged, valve 290 moves to the left position and conduit 70 is opened to exhaust through ports 314 and 316, thereby exhausting pressure from chamber 222 and releasing valve 170. The memory pressure in conduit 56 can then once again vary with governor pressure within its selective limits.

The servomotor control valve assembly 50 is provided to amplify the signal generated which reflects vehicle speed error. Vehicle speed error is the difference between actual vehicle speed and the speed of the vehicle at the time the unit was engaged and which is reflected by the memory pressure. The memory pressure in conduit 56 operates on the left end of valve 226 and governor pressure through conduit 32 operates on the right end of the valve. The areas of the valve lands 228, 238 and 240 are so selected that the force exerted by the memory pressure in chamber 232 acting on land 228 and valve end 230 plus the force of spring 236 is equal to the force exerted by the governor pressure in chamber 242 acting on the valve land 240 plus the force exerted by the control pressure operating on the difference in the area of lands 228 and 238. The control pressure is found in chamber 258 and is the regulated pressure produced by the servomotor control valve assembly 50. The control pressure is dependent upon the force of spring 236 and the difference in pressures between the memory pressure and the governor pressure acting on their respective areas. Once the system is engaged, changes in governor pressure will change the pressure output of the valve assembly 50, which is the control pressure. The control pressure is generated from line pressure entering port 248 and regulated by land 240 so that the control pressure is found in chamber 250. The diameters of valve lands 178, 188 and 190 of the memory valve assembly and valve lands 228, 238 and 240 of the control valve assembly 50 are so selected that the nominal control pressure obtained when the vehicle speed error is zero increases as the selected or reference vehicle speed increases. Thus the nominal control pressure produced by the control valve assembly 50 in conduit 74 will be greater for a 60 m.p.h. vehicle selected speed than it will be for a 40 m.p.h. selected vehicle speed.

A typical amplification which has been found to work quite satisfactorily sets up a ratio wherein 1 p.s.i. change of governor pressure produces 3.5 p.s.i. change in control pressure. For purposes of explanation only, it may be assumed that the governor pressure varies 1 p.s.i. for every mile per hour change in vehicle speed within the vehicle speed limitations to which the system is tailored. If the system is engaged when the vehicle is traveling at 60 m.p.h. the governor pressure will be 60 p.s.i. The memory valve assembly 48 will then produce a memory pressure in conduit 56 and in chamber 232 which is constant once the system is engaged and which will cause the control pressure generated in chamber 250 and the conduit connected thereto to be 20 p.s.i. when the vehicle is actually traveling at 60 m.p.h. If the vehicle speed should drop to 59 m.p.h. the memory pressure would remain the same. However, the governor pressure would now change to 59 p.s.i. This change in governor pressure will change the control pressure to 23.5 p.s.i. If the vehicle speed decreases another mile per hour the control pressure will change to 27 p.s.i. If the vehicle speed increases to 61 m.p.h. the memory pressure will still remain constant. However, the governor pressure will be increased to 61 p.s.i. and the control pressure will therefore be decreased to 16.5 p.s.i. It can therefore be seen that the servomotor control valve assembly 50, when the system is engaged, produces pressure changes in inverse relation to the governor pressure changes and at amplified values varying from a nominal pressure which is obtained when the vehicle speed error is zero.

In the memory valve assembly 48 previously discussed, spring 182 will produce the memory pressure in conduit 56 so long as valve 170 is held by lock pin 212, even when the governor pressure decreases to zero. While this normally would not occur because the system would be disengaged before the vehicle speed became zero, this characteristic is utilized to provide a safety feature. When the governor pressure is zero and the memory pressure continues to reflect a desired vehicle speed, the memory pressure acting on valve 226 will cause the control pressure in chamber 250 and conduit 74 to be very close to transmission line pressure. This particular set of circumstances produces the conditions which are required to operate one of the features of the safety valve assembly 72.

The safety valve assembly includes valve 270 which has three lands or spools. Lands 272 and 274 are the same diameter while land 276 is a larger diameter. The control pressure in conduit 74 is delivered to the first two ports 264 and 268 on the left side of the valve as seen in FIGURE 2. The restriction 266 associated with port 264 provides a dashpot orifice which acts as a timing or delaying device for the operation of the safety valve assembly. When the safety valve 270 is in its left operating position the control valve port 268 is connected to the cylinder control valve port 275 to deliver control pressure from conduit 74 to conduit 82 and thence to the actuating valve assembly 54.

Since a given control pressure delivered to power chamber 332 of the servomotor 86 will open the throttle valve 12 to its maximum amount by sufficiently overcoming piston return spring 340 and throttle return spring 15, it is not necessary for the control presure to be higher than this value. If the control pressure produced in chamber 250 and conduit 74 should exceed this value the system can utilize the existence of the excessive pressure as a signal to determine that something may be wrong with the system. The valve assembly 72 is therefore so set that when the control pressure transmitted to chamber 262 exceeds this previously determined maximum value it will act on land 272 of valve 270 to move the valve to its right hand position shown in FIGURE 2. This connects the cylinder control port 275 and conduit 82 to the exhaust port 280 and will exhaust conduit 82 and actuating valve chamber 326. Thus the conduit 84 and the servomotor power chamber 332 are exhausted, even though the actuating valve assembly remains in the energized position. If the lock pressure port 282 of the safety valve assembly 72 is pressurized when the valve 270 moves to the right to the position shown in FIGURE 2, the valve will stay in its right hand position, even though the control pressure in chamber 262 later returns to its original lower value. For example, at zero car speed with the control pressure still being generated, the control pressure will be at a high value close to transmisison line pressure and will move the safety valve 270 to the righ hand position. Lock pressure in conduit 70 acts on land 276 to hold valve 270 to the right. This assures that the control system cannot be engaged if the car is standing still or below a certain speed reflected by a certain governor pressure. Similarly, if the system is in operation and for some reason cannot be electrically disengaged, the application of the brake pedal 16 applying the brakes tends to slow the vehicle down against the control of the system, causing the system to act to open the throttle valve further even though the operator is actually reducing speed by use of the brake. At a predetermined reduction of speed in this manner, the system will automatically disconnect the servomotor power chamber from the remainder of the system through the action of the safety valve assembly 72.

The actuating valve assembly 54 is the mechanism that actually energizes the system. Its valve 290 has three spools or lands 312, 318 and 320 having the same diameters. The line presure port 294 and chamber 292 are connected through the bleed orifice or passage 310 to the recess 306. Spring 308 pushes the valve 290 to its left hand position so that line pressure also exists between land 320 and the plate 296. When the solenoid 90 is not energized, valve 302 keeps orifice 298 closed. When the pressure in recess 306 and on the right side of land 320 is relieved through the orifice 298 by movement of valve 302 to the right to the position shown in FIGURE 2, the valve 290 moves to its right hand position, which is the system engaging position. When the solenoid valve is deenergized, the presure on the two ends of valve 290 become equal and the force of spring 308 therefore moves the valve to the left position. In this position the land 312 separates ports 294 and 314 and connects port 314 to exhaust port 316, thereby exhausting the lock pressure in conduit 70. This relieves the pressure in the lock servo pressure chamber 222 and releases the memory valve 170 as above described. The control pressure in conduit 84 is also connected to exhaust through ports 324 and 316. Land 320 also cuts off port 322. When the valve 290 is moved to the right hand or system engaging position, line pressure is fed into the locking pressure port 314 from chamber 292 and the lock servo 68 is energized. The lock pressure is also transmitted through conduit 70 to port 282 of the safety valve. The cylinder control pressure delivered to the actuating valve through conduit 82 and port 322 is connected to port 324 and conduit 84 so that the control pressure is transmitted to the servomotor power chamber 332.

The servomotor 86 responds to control pressure in the power chamber 332 and to changes therein as generated by the servomotor control valve assembly 50 in response to changes in governor pressure in relation to memory pressure to control the throttle valve 12. The servomotor push rod 88 may be connected by a flexible link to the throttle valve linkage 14 rather than positively connected, with the connection being such that the flexible link transmits a pulling force tending to open the throttle valve as pressure increases in power chamber 332. The usual throttle valve linkage includes the throttle valve return spring 15 which will close the throttle valve when the pressure in chamber 332 is decreased to unbalance its force. Thus the system will operate to control the engine power in accordance with changes in actual vehicle speed from a reference vehicle speed to maintain the actual vehicle speed at a substantially constant value.

The modified system schematically illustrated in FIGURE 3 utilizes the same pressure boost valve assembly 34, actuating valve assembly 54, locking mechanism 68, safety valve assembly 72, and servomotor 86 utilized in the system of FIGURES 1 and 2. It also utilizes the same electrical control arrangement shown in FIGURE 1 for the solenoid 90 and is operative with the same transmission 22 and engine 10. Since these various valve assemblies are the same as that more particularly illustrated in FIGURE 2 and described above, the same reference characters are utilized and the above description for those assemblies equally applies. A different valve arrangement is utilized in place of the memory valve assembly 48 and the servomotor control valve assembly 50. This arrangement is the memory signal and control pressure generating assembly 446. This assembly may be considered to be in two sections with the left side thereof being the memory signal generating section 448 and the right side thereof being the control pressure generating section 450. The assembly 446 includes a double stepped bore provided in the housing 132 containing the other valve assemblies. The largest bore section, at the left end of the assembly, is in the memory signal section 448 and has a plug 468 in the left end thereof in which is provided a recessed bore axially aligned with the assembly bore so that valve 470, reciprocably received in the plug recessed bore, has its axis coincident with the axis of the assembly bore. The plug has an open end opening into the assembly bore through which valve 470 is extendable. The left end of the plug bore is formed to provide a chamber 472 which is connected through port 474 to the governor pressure conduit 32 by way of a restriction 476. The left end of valve 470 has a reduced diameter end so that pressure in chamber 472 is always capable of urging the valve to the right. Valve 470 is illustrated as being provided with a series of lands 478 formed on the portion of the valve within the plug bore. The right end 480 of the valve provides a seat against which one end of a compression spring 482 is seated. The other end of spring 482 engages the recessed end 484 of the valve 486. Valve 486 is reciprocably received in the assembly bore section contained in the servomotor control pressure generating section 450. It is therefore at the opposite end of the assembly bore from valve 470. Valve 486 has lands 488 and 490 axially spaced from each other by a reduced diameter valve section, with land 488 being slightly larger in diameter than land 490 and therefore engaging an intermediate diameter section of the assembly bore while land 490 engages the smallest diameter section of the assembly bore. The reduced valve end 492 of valve 486 is in the end chamber 494 formed in the end of the assembly bore. Chamber 494 is connected by the port 496 to the governor pressure conduit 32. Port 500 is adjacent port 496 in housing 132 and connects the smallest assembly bore section, adjacent land 490, with the transmission line pressure conduit 30. Port 502 is next adjacent port 500 and connects the control pressure conduit 74 with a chamber 504 provided by the reduced diameter valve section between valve lands 488 and 490. Port 500 is so positioned relative to port 502 and chamber 504 that the left edge of land 490 regulates line pressure from port 500 to port 502 to generate the servomotor control pressure in chamber 504 and conduit 74. Exhaust port 506 is adjacent port 502 and is controlled by land 488. Port 508 connects chamber 510, separating valves 470 and 486, to exhaust. A spring retainer sleeve 512 is positioned in chamber 510 so that its left end engages the end of plug 468 about the open end of the plug bore. The retainer sleeve 512 is necked down to a smaller diameter so that it can extend within the intermediate diameter assembly bore section forming a part of chamber 510. A spring 514 engages the right end of sleeve 512 and the left end of valve 486. An exhaust port 516 is provided in the housing 132 radially adjacent the necked down portion of sleeve 512. Exhaust port 506 is so positioned that sufficient leftward movement of valve 486 will cause chamber 504 to be connected to exhaust through that port. Exhaust port 508 keeps the chamber 510 in which springs 482 and 514 and valve ends 480 and 484 are positioned at exhaust pressure at all times.

It can be seen that the valve arrangement of assembly 446 combines the function of the memory valve assembly 48 and the servomotor control valve assembly 50 of FIGURES 1 and 2. This simplifies the hydraulic arrangement. The assembly 446, in conjunction with the locking mechanism 68 and mechanism actuated by it, functions to remember the vehicle speed at the time the system is energized and also to send the proper holding and corrective pressures to the servomotor 86. The locking servo 68 and the mechanism actuated by it, including a lock pin 212, functions in the same manner as that described above with regard to FIGURE 2. When the system is de-energized, the position of valve 470 is determined by the spring force of spring 482 pushing to the left opposed by the force of governor pressure in chamber 472 acting on the left end of the valve and pushing to the right. When the system is energized, lock pin 212 side loads valve 470 with sufficient force so that its position will not change with changes in governor pressure. The spring force or load of spring 482, which is variable due to the position of valve 470, and the fixed spring force or load of spring 514 push the valve 486 to the right. This is opposed by the force of governor pressure operating in chamber 494 on the right end 492 of the valve and the force of control pressure in chamber 504 operating on the difference in areas of valve lands 488 and 490. Transmission line pressure is fed to the valve system through the port 500 and is regulated by the left edge of land 490 into chamber 504. Chamber 504 is connected by the port 502 to the control pressure conduit 74. When the vehicle is standing still, valve 470 will be in the full left position. Since governor pressure is zero, control pressure in chamber 504 will be equal to the installed spring loads on springs 482 and 514 divided by the force generated by the control pressure acting on the difference in areas of valve lands 488 and 490. This pressure is high enough to trap the safety valve 270 to the right, insuring that the system is inoperative. It is, therefore, impossible to engage the system when the vehicle is stopped, at very low speeds, or in any transmission operating moving range rather than a forward range. Minimum cruise engagement speed of the system is established by the installed load of spring 482. Maximum cruise engagement and range is established by the load on spring 482 when the right end of valve 470 engages the necked down portion of the spring retainer sleeve 512. The upper view of valve 470 in FIGURE 3 shows the latter position. In vehicle road speed ranges in which the system is operative, valve 470 places a force on spring 482 equivalent to the force generated by governor pressure acting on the area of the left end of valve 470. Thus the memory signal generated is a spring force in this embodiment instead of a regulated pressure, as in the first embodiment. When the system is energized, the position of valve 470 is locked or stabilized by locking servo 68 acting through lever 214 on pin 212. This locks or stabilizes the load on spring 482 which reflects the vehicle speed at this time. The spring load is therefore the reference speed signal. This load gives a specific control pressure value in control pressure chamber 504 and conduit 74. If for some reason the vehicle speed, and therefore the governor pressure, decreases, the control pressure in chamber 504 acting on the servomotor 86 must increase to maintain the force balance on valve 486 and advance the engine throttle. If the vehicle speed and governor pressure increase, the control pressure must decrease to maintain valve balance and retard the engine throttle. Spring 514 provides sufficient servomotor control pressure to balance the servomotor and throttle return spring forces. Sensitivity of the system can be adjusted by adjusting the area of valve land 490 and the difference in areas of valve lands 488 and 490. A satisfactory operating system will have a sensitivity or amplification ratio of 3.5:1 which results in a change of 3.5 p.s.i. in control pressure for one p.s.i. change in governor pressure.

What is claimed is:

1. A road speed control system for a vehicle having an engine, said system comprising
   a source of governor pressure reflecting actual vehicle speed,
   a source of line pressure which is greater than the governor pressure required to accurately reflect actual vehicle speed,
   first valve means responsive to said governor pressure and establishing a speed signal varying in direct relation to variations in said governor pressure above a predetermined governor pressure,
   locking means selectively locking said first valve means against further response to said governor pressure and therefore establishing said speed signal at a selected vehicle speed as a reference speed signal,
   second valve means differentially responsive to said governor pressure and said reference speed signal and modifying line pressure to establish a control pressure reflecting changes in engine power demand required to maintain said governor pressure at a fixed pressure reflecting an actual vehicle speed equal to the vehicle speed reflected by said reference speed signal,
   and an engine control including a servomotor receiving said control pressure to control the vehicle engine to maintain the vehicle speed at the selected vehicle speed reflected by the reference speed signal.

2. The road speed control system of claim 1,
   said first valve means modifying line pressure to establish said speed signal as a pressure, said reference speed signal therefore also being a pressure,
   and said second valve means being differentially responsive to said governor pressure and the pressure of said reference speed signal.

3. The road speed control system of claim 1,
   said first and second valve means respectively including first and second valves spaced in a common housing bore,
   and a compression spring in said housing bore having the opposite ends thereof engaging the adjacent ends of said first and second valves,
   said governor pressure acting on the opposite ends of said first and second valves,
   said speed signal being the compressive force of said spring resulting from movement of said first valve by said governor pressure,
   said reference speed signal being the compressive force of said spring at the time said first valve means is locked by said locking means.

4. The road speed control system of claim 1 further comprising
   a spring connecting said first and second valve means, the force established in said spring by said first valve means in response to said governor pressure being said speed signal, the particular force established in said spring by said first valve means at the time said first valve means is locked by said locking means being said reference speed signal.

5. The system of claim 1,
   said sources of governor and line pressure being a vehicle transmission having a governor pressure output and a line pressure output.

6. The system of claim 5 further comprising
   line pressure boost valve means receiving said governor pressure and said line pressure and producing a governor pressure controlled modulator pressure so long as at least a predetermined governor pressure is received, said transmission receiving said modulator pressure and boosting said line pressure in accordance with said modulator pressure to maintain said line pressure output at a pressure value above said governor pressure at least by a predetermined minimum amount.

7. The system of claim 1 further comprising
   an actuating valve receiving line pressure and selectively connecting received line pressure to actuate said locking means, said locking means including a pressure actuated actuator.

8. The system of claim 7,
   said actuating valve further receiving said control pressure and selectively connecting said control pressure to said servomotor concurrently with the selective connection of line pressure to actuate said locking means, and selectively connecting said servomotor and said locking means pressure actuator to exhaust.

9. The system of claim 8 further comprising
   safety valve means receiving said control presure fluidly intermediate said second valve means and said actuating valve and maintaining the fluid connection therebetween until said control pressure reaches a predetermined maximum pressure acting on said safety valve means to fluid disconnect said second valve means control pressure from said actuating means.

10. The system of claim 9,
    said safety valve means further receiving locking fluid pressure delivered to said locking means from said actuating valve, said locking fluid pressure acting to hold said safety valve means in the control pressure disconnect position independently of further change in said control pressure.

11. A road speed control system for a vehicle having an engine and a hydraulically operated transmission producing a transmission governor pressure reflecting vehicle speed and a transmission line pressure,
    said system comprising
    an engine control for controlling vehicle speed and including a control pressure actuated servomotor,
    memory valve means receiving said governor pressure and generating a continuous signal reflecting actual vehicle speed and including means selectively energizable to hold said memory valve means against further signal generation so that the signal generated thereby when said holding means is energized becomes a constant reference signal establishing a reference vehicle speed as that vehicle speed at which the vehicle was traveling when said holding means was energized,
    servomotor control valve means receiving said governor pressure and said continuous signal generated by said memory valve means and transmission line pressure and generating a servomotor contol pressure, said servomotor control pressure being a function of actual vehicle speed as reflected by governor pressure and a selected desired vehicle speed as reflected by said constant reference signal when said continuous signal generated by said memory valve means become a constant reference signal establishing a reference vehicle speed,
    actuating valve means having an actuator selectively operable by the vehicle operator, said actuating valve means receiving said servomotor control pressure and selectively connecting said servomotor control pressure to said servomotor while concurrently energizing said selectively energizable holding means for said memory valve means and selectively disconnecting said servomotor control pressure from said servomotor and deenergizing said holding means and connecting said servomotor to exhaust.

12. The system of claim 11, said signal generated by said memory valve means being force stored in a spring positioned in force-exerting relation between said memory valve means and said servomotor control valve means.

13. The system of claim 11, said actuating valve means receiving line pressure and said holding means including a pressure actuated member, said actuating valve means energizing said holding means by connecting line pressure thereto and deenergizing said holding means by disconnecting line pressure therefrom and connecting said holding means pressure actuated member to exhaust.

14. The system of claim 13 further comprising a safety valve assembly including a safety valve and a safety valve spring urging said valve to a normally operable position, said safety valve assembly receiving said servomotor control pressure therethrough fluidly intermediate said servomotor control valve means and said actuating valve means when said safety valve is in said normally operable position and further receiving said servomotor control pressure acting on an area of said safety valve to oppose said safety valve spring, said safety valve being movable by a predetermined servomotor control pressure to a safety cut-off position to disconnect servomotor control pressure to said actuating valve means and connect said servomotor to exhaust.

15. The system of claim 14, said safety valve assembly having a restrictive orifice through which the servomotor control pressure acting on an area of said safety valve is received, said restrictive orifice providing a delay for movement of said safety valve by the servomotor control pressure.

16. The system of claim 14, said safety valve assembly further having holding means acting on said safety valve to hold it in the safety cut-off position independently of further change in servomotor control pressure generated by said servomotor control valve means.

17. The system of claim 16, said safety valve holding means being an area on said safety valve fluid connected with line pressure from said actuating valve to said memory valve holding means by movement of said safety valve to said safety cut-off position so that said safety valve spring is opposed by the pressure to said memory valve holding means until line pressure is no longer delivered to said memory valve holding means.

18. The system of claim 11, said actuating valve means actuator including a solenoid and a member operated by energization of said solenoid, said system further comprising solenoid control means including a solenoid holding switch assembly and vehicle operator-operated switch means selectively energizing said solenoid and said holding switch assembly and selectively deenergizing said solenoid and said holding switch assembly.

19. In a fluid pressure control system having an input signal pressure and an input power pressure and an output regulated signal pressure, valve mechanism comprising
valve means biased in one direction by said input signal pressure and having port means controlled by movement of said valve means, said port means receiving and regulating said input power pressure to generate said output regulated signal pressure,
and means associated with said valve means and selectively operable to stabilize said valve means against further bias in said one direction by said input signal pressure.

20. In the fluid pressure control system of claim 19, said valve means comprising
a first valve having said input signal pressure biasing an area thereof in one direction and a second valve connected with said first valve by yieldable means, said second valve controlling said port means and having one of said signal pressures biasing an area thereof in the other direction, said selectively operable stabilizing means being a lock holding said first valve against movement in response to the bias of said input signal pressure.

21. In the fluid pressure control system of claim 20, said second valve being biased in said other direction by said input signal pressure.

22. In the fluid pressure control system of claim 20, said second valve being biased in said other direction by said output regulated signal pressure.

23. In the fluid pressure control system of claim 22, said valve means further comprising a third valve receiving said output regulated signal pressure from said port means and biased thereby in one direction and receiving said input signal pressure and oppositely biased thereby and having second port means receiving and regulating said input power pressure and thereby producing an output control pressure regulated in accordance with the opposed biases of said output regulated signal pressure and said input signal pressure on said third valve.

References Cited

UNITED STATES PATENTS

| | | | |
|---|---|---|---|
| 2,972,391 | 2/1961 | Faiver et al. | 180—108 |
| 2,976,946 | 3/1961 | Denman et al. | |
| 3,062,310 | 11/1962 | McCathron et al. | 180—109 |
| 3,081,837 | 3/1963 | Fiteny | 180—108 |
| 3,125,201 | 3/1964 | Fisher | 251—284 |
| 3,133,611 | 5/1964 | Halsey et al. | 180—108 |

KENNETH H. BETTS, *Primary Examiner.*